(12) United States Patent
Czach et al.

(10) Patent No.: US 8,651,519 B2
(45) Date of Patent: Feb. 18, 2014

(54) SEATBELT ANCHOR AIRBAG

(75) Inventors: Brian Keith Czach, Shelby Township, MI (US); David Warren Funnell, Windsor (CA); Jan Pontus Soderstrom, Rochester, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/441,998

(22) Filed: Apr. 9, 2012

(65) Prior Publication Data

US 2013/0264804 A1    Oct. 10, 2013

(51) Int. Cl.
  *B60R 21/18* (2006.01)
  *B60R 21/2338* (2011.01)
(52) U.S. Cl.
  USPC .............. 280/733; 280/743.2; 297/482
(58) Field of Classification Search
  USPC ........... 280/728.2, 728.3, 730.2, 733, 743.1, 280/743.2
  See application file for complete search history.

(56) References Cited

U.S. PATENT DOCUMENTS

| | | | | |
|---|---|---|---|---|
| 3,865,398 A | * | 2/1975 | Woll | 280/733 |
| 5,062,662 A | * | 11/1991 | Cameron | 280/733 |
| 5,161,821 A | * | 11/1992 | Curtis | 280/730.2 |
| 5,474,326 A | * | 12/1995 | Cho | 280/733 |
| RE36,587 E | * | 2/2000 | Tanaka et al. | 280/733 |
| 6,340,173 B1 | * | 1/2002 | Specht | 280/733 |
| 6,460,881 B1 | * | 10/2002 | Adomeit | 280/733 |
| 7,377,544 B2 | * | 5/2008 | Itoga | 280/733 |
| 7,607,687 B2 | * | 10/2009 | Clute et al. | 280/733 |
| 7,661,697 B2 | * | 2/2010 | Itoga | 280/728.2 |
| 7,681,911 B2 | * | 3/2010 | Ruthinowski et al. | 280/733 |
| 7,815,218 B2 | * | 10/2010 | Itoga | 280/733 |
| 7,866,690 B2 | * | 1/2011 | Itoga | 280/733 |
| 7,874,581 B2 | * | 1/2011 | Itoga | 280/733 |
| 7,874,582 B2 | * | 1/2011 | Murakami | 280/733 |
| 7,883,106 B2 | * | 2/2011 | Mical | 280/733 |
| 2002/0171233 A1 | * | 11/2002 | Grace | 280/733 |
| 2007/0063493 A1 | * | 3/2007 | Higuchi et al. | 280/733 |
| 2011/0187087 A1 | * | 8/2011 | Kibat | 280/730.2 |
| 2012/0038137 A1 | * | 2/2012 | Wipasuramonton et al. | 280/733 |
| 2012/0319386 A1 | * | 12/2012 | Bahr et al. | 280/733 |

FOREIGN PATENT DOCUMENTS

JP    2004351948 A  * 12/2004  ............ B60R 21/18

* cited by examiner

*Primary Examiner* — Paul N Dickson
*Assistant Examiner* — Laura Freedman
(74) *Attorney, Agent, or Firm* — Harness, Dickey & Pierce, P.L.C.

(57) ABSTRACT

A restraint system for a mobile platform is provided and may include a seatbelt, an anchor attached to the seatbelt and to the mobile platform, and an airbag attached to the mobile platform via the anchor. The airbag may be movable from a pre-deployed state to an inflated state.

19 Claims, 6 Drawing Sheets

SEATBELT ANCHOR AIRBAG

FIELD

The present disclosure relates to airbags and more particularly to a side-impact airbag mounted to a seatbelt anchor.

BACKGROUND

This section provides background information related to the present disclosure which is not necessarily prior art.

Mobile platforms such as vehicles typically include one or more airbags that work in conjunction with one another and with other safety systems to absorb or otherwise dissipate energy associated with an impact event away from occupants of the mobile platform. For example, a mobile platform such as a vehicle may incorporate one or more front airbags mounted in a steering wheel or instrument panel of the vehicle that absorb energy associated with a front-impact event. Likewise, a vehicle may additionally incorporate a side airbag in a door, pillar and/or seat assembly of the vehicle in an effort to absorb energy associated with a side-impact event.

While conventional airbags adequately protect vehicle occupants, integration of the various airbags into a vehicle is often challenging. For example, locating a side airbag within a vehicle seat typically requires the size of the seat to be increased in order to accommodate the side airbag along with other structural and functional components of the vehicle seat. Likewise, positioning a side airbag within a vehicle door often increases the size of the door, as the airbag must be positioned away from other components of the door (i.e., window glass, door latch, etc.) to permit proper operation of each component.

Mounting a side airbag in a vehicle door or in a pillar of a vehicle also requires the airbag to be relatively large to allow the airbag to span the distance from the particular location of the airbag (i.e., vehicle door and/or pillar) to an occupant of the vehicle. The increased size of the airbag likewise results in an increase in the size of an inflator associated with the airbag, thereby increasing the overall cost and size of the assembly. Further, the increase in size of both the airbag and inflator further complicates packaging of the airbag and inflator within the vehicle, as more space is required within the door, pillar, and/or seat to accommodate the assembly.

Finally, installing an individual side airbag in a vehicle seat, a vehicle door, and/or a vehicle pillar requires each airbag to be installed separately from other restraint systems of the vehicle and from one another and, thus, requires each individual airbag to have its own structure that allows for such installation (i.e., mounting brackets, trim, etc.). As such, installation of side airbags typically increases the overall cost and complexity associated with manufacturing each individual airbag and, as a result, increases the cost and complexity associated with manufacturing the vehicle.

SUMMARY

This section provides a general summary of the disclosure, and is not a comprehensive disclosure of its full scope or all of its features.

A restraint system for a mobile platform is provided and may include a seatbelt, an anchor attached to the seatbelt and to the mobile platform, and an airbag attached to the mobile platform via the anchor. The airbag may be movable from a pre-deployed state to an inflated state.

In another configuration, a restraint system for a mobile platform is provided and may include a seatbelt and an airbag attached to the seatbelt. The airbag may be movable from a pre-deployed state to an inflated state and may be guided by the seatbelt when moving from the pre-deployed state to the inflated state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a restraint device 10 is provided and may include a seatbelt 12 and an airbag 14. In one configuration, the restraint device 10 may be used in conjunction with a mobile platform 16 incorporating a seat 18. For example, the restraint device 10 may be positioned relative to the seat 18 of the mobile platform 16 to protect an occupant 20 disposed on the seat 18 during a side-impact event. As will be described in greater detail below, the seatbelt 12 and airbag 14 may be attached to the mobile platform 16 at the same location and, further, may be installed as a single unit.

The seatbelt 12 may include a first end 22, a second end 24, and a main body 26 extending between the first end 22 and the second end 24. The first end 22 may include a loop 28 formed by overlapping a portion of the seatbelt 12 at the first end 22 and subsequently providing the overlapped portion with stitching 30 (FIG. 3) to secure the seatbelt 12 to itself. The stitching 30 may maintain the shape and location of the loop 28 to allow the seatbelt 12 to be attached to the mobile platform 16.

Figure 1:
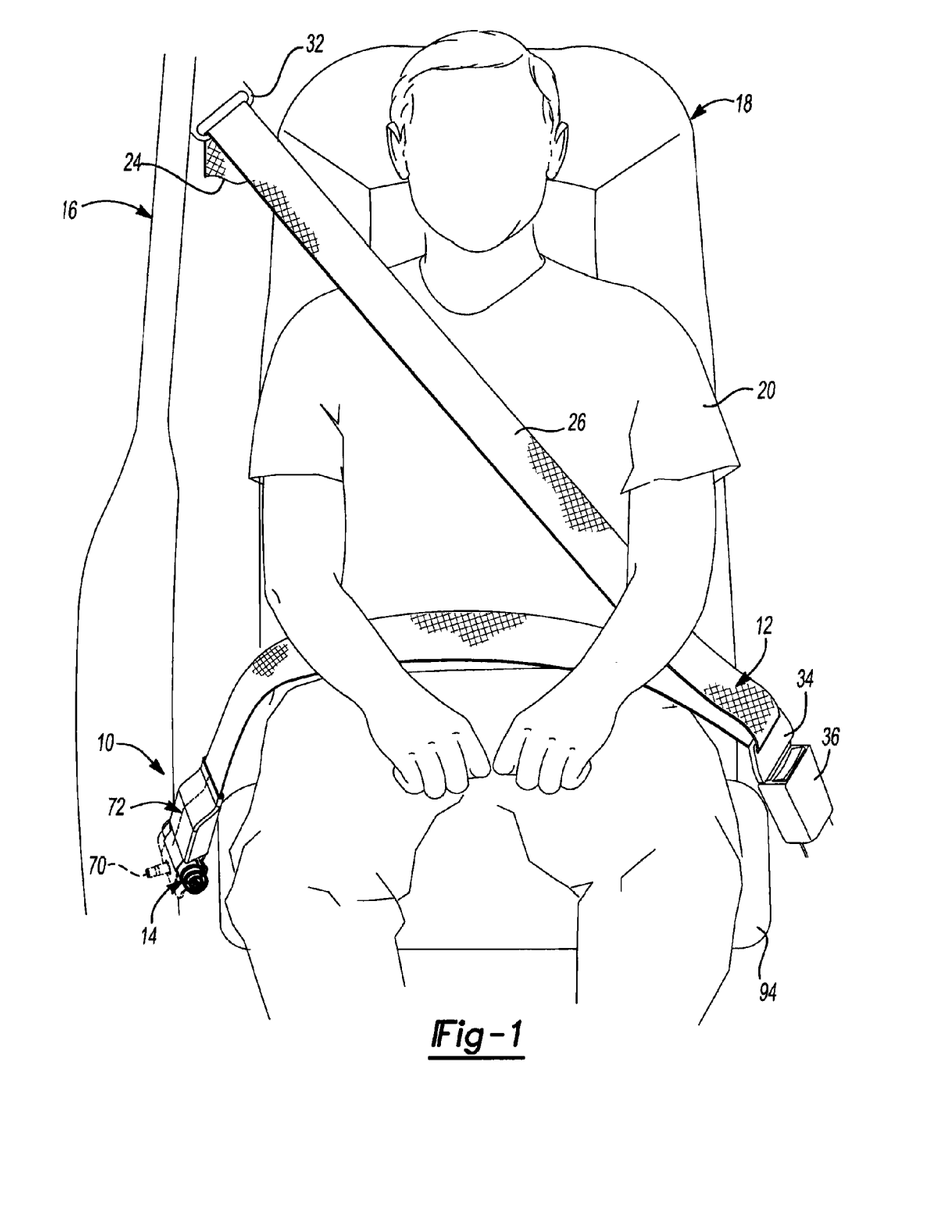
FIG. 1 is a perspective view of a mobile platform incorporating a restraint device in accordance with the principles of the present disclosure.

The second end 24 may be disposed at an opposite end of the main body 26 than the first end 22 and may be attached to the mobile platform 16. For example, the second end 24 may be slidably received within an upper anchor 32 (FIG. 1) prior to being attached to the mobile platform 16 at the second end 24. The second end 24 may be attached to the mobile platform 16 proximate to the upper anchor 32 and may be attached to the mobile platform 16 via a retractor (not shown) that selectively imparts a force on the seatbelt 12 to cause the main body 26 of the seatbelt 12 to retract when the seatbelt 12 is not in use. Specifically, the retractor may impart a force on the seatbelt 12 at the second end 24 to cause the main body 26 to retract into the retractor, as the main body 26 slidably passes through the upper anchor 32.

The retractor is permitted to retract the main body 26 when a tongue 34 (FIG. 1) slidably attached to the main body 26 is disengaged from a latch 36. Retracting a portion of the main body 26 into the retractor moves the seatbelt 12 away from an occupant 20 to allow the occupant 20 unfettered access to the seat 18 during entry to and exit from the mobile platform 16. Once the occupant 20 is disposed on the seat 18, a force may be applied to the main body 26 via the tongue 34, thereby causing the main body 26 to unwind within the retractor and slide relative to and within the upper anchor 32 until the tongue 34 is secured to the latch 36. When the tongue 34 is secured to the latch 36, the seatbelt 12 may extend over the waist and chest area of the occupant 20 in an effort to secure the occupant 20 to the seat 18.

The main body 26 may extend from the first end 22 to the second end 24 and may be formed from a woven material. For example, the main body 26 may be formed from a woven, nylon material that provides the seatbelt 12 with a relatively high tensile strength. Forming the main body 26 from a material having a relatively high tensile strength allows the main body 26 to retain an occupant 20 within the seat 18 during an impact event experienced by the mobile platform 16.

Figure 2:
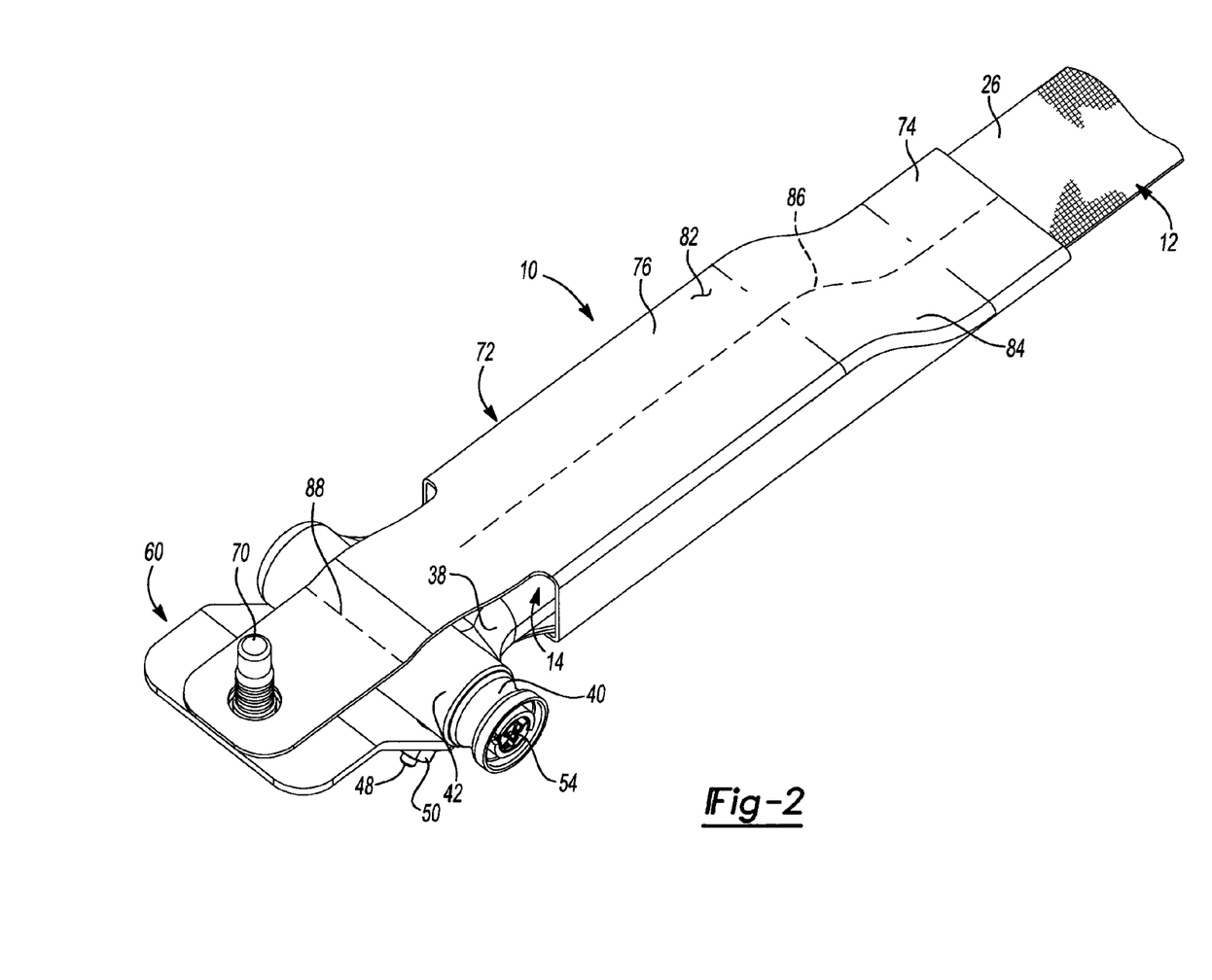
FIG. 2 is a partial top perspective view of a restraint device in accordance with the principles of the present disclosure.
Figure 3:
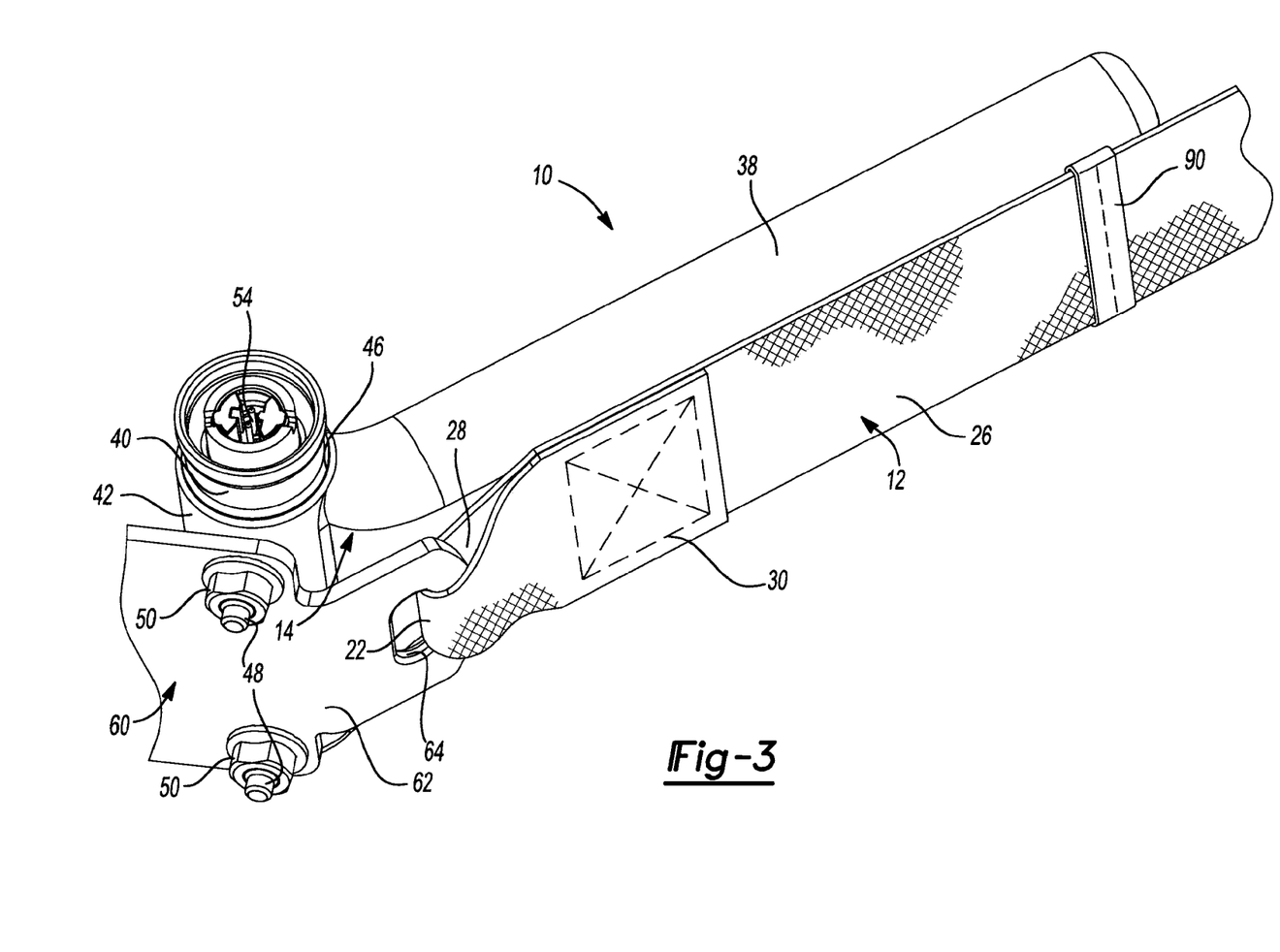
FIG. 3 is a partial bottom perspective view of the restraint device of FIG. 2 with a cover removed to show internal components of the restraint device.
Figure 4:
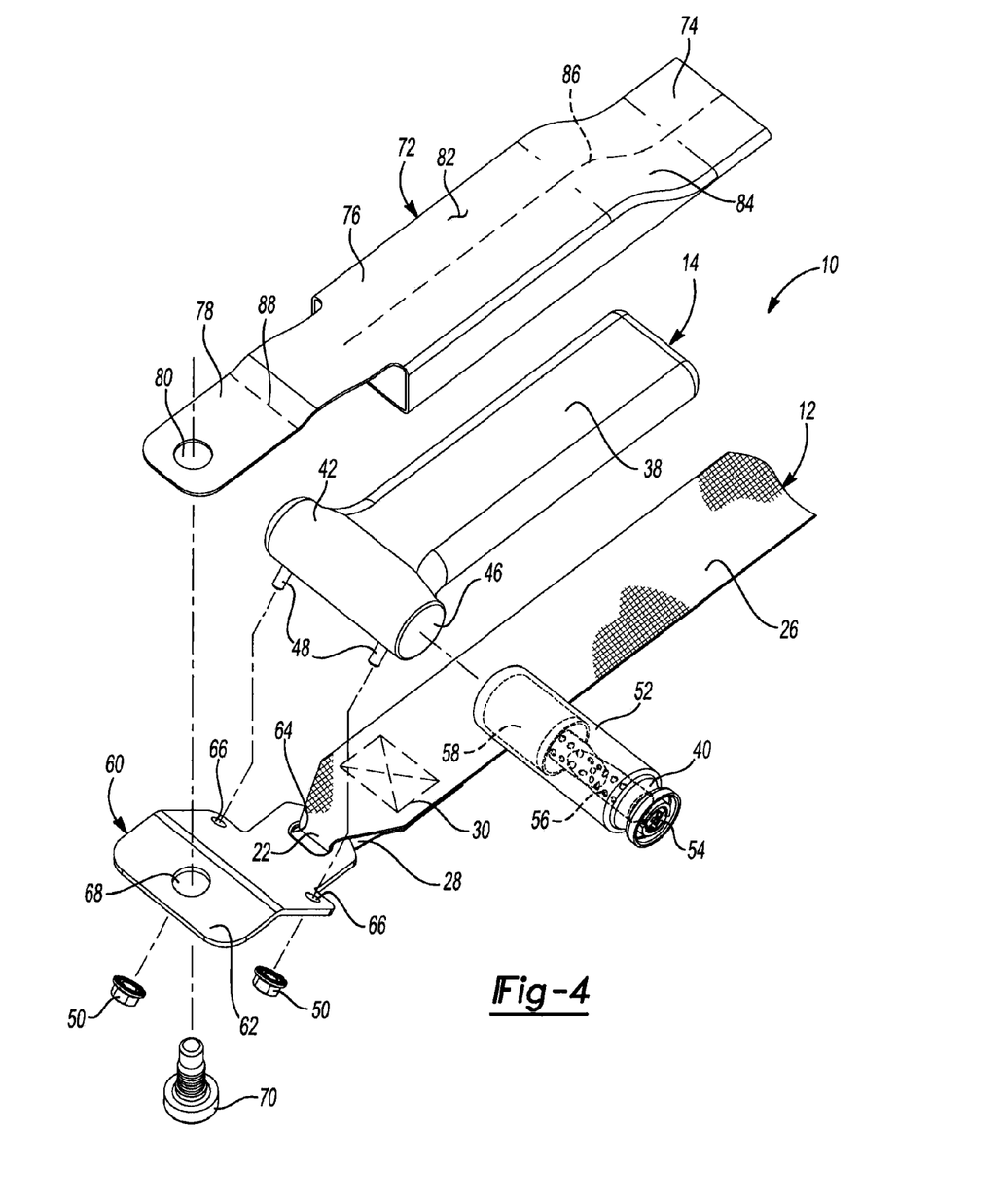
FIG. 4 is an exploded view of the restraint device of FIG. 2.
Figures 5, 6, 7:
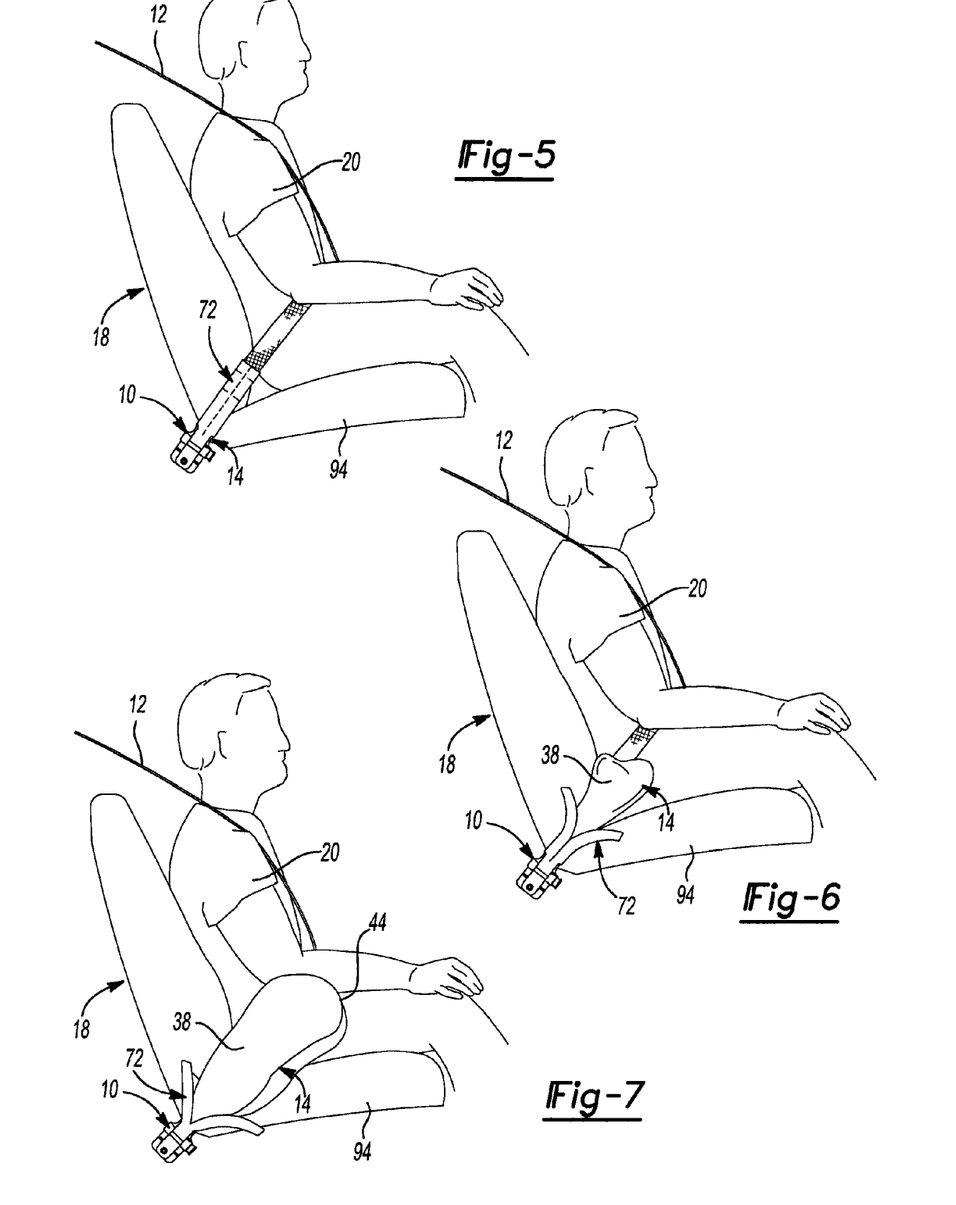
FIG. 5 is a side view of a restraint device in accordance with the principles of the present disclosure associated with a seat and in a pre-deployed state.
FIG. 6 is a side view of a restraint device in accordance with the principles of the present disclosure associated with a seat and in a partially inflated state.
FIG. 7 is a side view of a restraint device in accordance with the principles of the present disclosure associated with a seat and in an inflated state.
Figure 8:
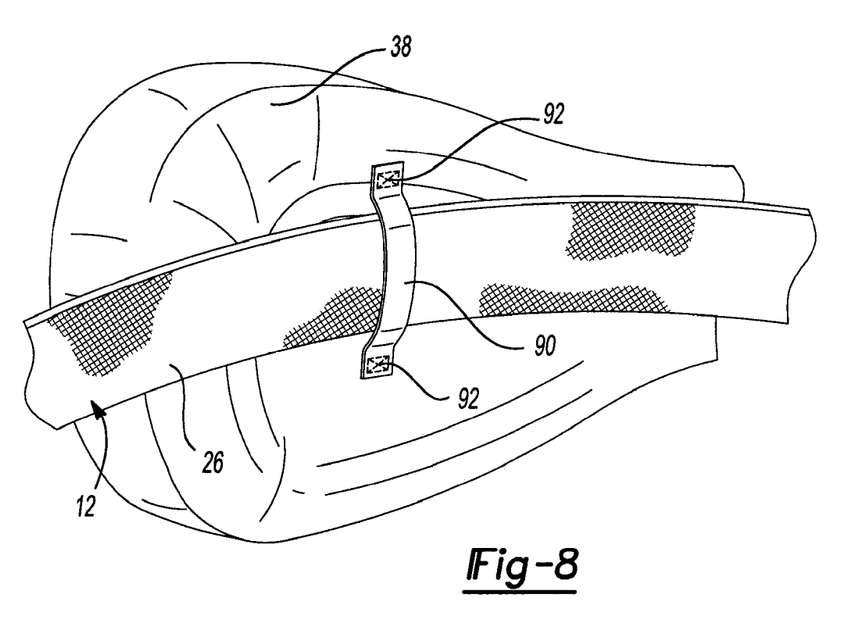
FIG. 8 is a perspective view of a restraint device in accordance with the principles of the present disclosure in an inflated state.

The airbag 14 may be attached to the main body 26 of the seatbelt 12 to position the airbag 14 in close proximity to the first end 22. The airbag 14 may include a cushion 38 and an inflator 40, as shown in FIGS. 2-4. The cushion 38 may be formed from a woven material such as, for example, a cut-and-sewn airbag-cushion material, a one-piece woven (OPW) airbag-cushion material, or a laminate airbag-cushion material. Regardless of the particular material used in forming the cushion 38, the cushion 38 may include a first end 42 disposed proximate to the first end 24 of the seatbelt 12 and a second end 44 (FIG. 7) that forms a distal end of the cushion 38 when the cushion 38 is moved from a pre-deployed state (FIG. 5) to a deployed state (FIG. 7).

The first end 42 may include a pocket 46 that receives the inflator 40 therein and may also include a pair of fasteners 48 that extend from the first end 42. In one configuration, the fasteners 48 are threaded studs that are fixed to the first end 42 and threadably receive nuts 50 to attach the fasteners 48 and, thus, the airbag 14, to the mobile platform 16.

The inflator 40 may include a substantially cylindrical housing 52 (FIG. 4), a squib or initiator 54, a diffuser 56 (FIG. 4), and a pyrotechnic material 58 (FIG. 4). The inflator 40 may be received within the pocket 46 to secure the inflator 40 to the cushion 38. In one configuration, the fasteners 48 may be fixedly attached to the cylindrical housing 52 of the inflator 40 to allow the fasteners 48 to extend through the first end 42 and attach the fasteners 48 to the cushion 38 at the first end 42. Specifically, if the fasteners 48 are fixedly attached to the cylindrical housing 52, the fasteners 48 may extend through openings (not shown) formed through the cushion 38 at the first end 42 to allow the fasteners 48 to engage the cushion 38 at the first end 42, thereby restricting removal of the cylindrical housing 52 and, thus, the inflator 40, from the pocket 46. Once the nuts 50 are threadably received by the fasteners 48 upon installation of the airbag 14 within the mobile platform 16, engagement between the cylindrical housing 52 of the inflator 40 and the cushion 38 is further enhanced, as the first end 42 of the cushion 38 is essentially compressed between the cylindrical housing 52 and the nuts 50.

Positioning the inflator 40 within the pocket 46 of the cushion 38 allows the inflator 40 to be in fluid communication with an interior of the cushion 38. Therefore, when electricity is supplied to the squib/initiator 54 and the pyrotechnic material 58 is ignited, the resulting gas generated by the pyrotechnic material 58 is permitted to flow into and inflate the cushion 38 via the diffuser 56. Movement of the gas from the inflator 40 into the interior of the cushion 38 causes the cushion 38 to expand and move from the pre-deployed state (FIG. 5) to the inflated state (FIG. 7).

The seatbelt 12 and airbag 14 may be attached to the mobile platform 16 at the same location. For example, the seatbelt 12 and airbag 14 may be attached to the mobile platform 16 by a common mounting bracket or anchor 60. The anchor 60 may include a main body 62, a seatbelt aperture 64, a pair of airbag apertures 66, and an attachment aperture 68. The seatbelt aperture 64, airbag apertures 66, and attachment aperture 68 may be formed through the main body 62 to allow the seatbelt 12 and airbag 14 to be mounted to the anchor 60 and to allow the anchor 60 to be attached to the mobile platform 16.

The seatbelt aperture 64 may receive the first end 22 of the seatbelt 12 prior to the loop 28 being formed via the stitching 30. Specifically, the seatbelt 12 may be routed through the seatbelt aperture 64 prior to being folded on itself and stitched to form the loop 28. Once the loop 28 is formed and the stitching 30 is provided, the loop 28 essentially encircles a portion of the main body 62 at the seatbelt aperture 64, thereby attaching the first end 22 of the seatbelt 12 to the anchor 60.

The airbag apertures 66 may be spaced apart from one another and positioned relative to the main body 62 to accommodate and receive the fasteners 48. Specifically, the fasteners 48 may be received by respective airbag apertures 66 to permit the fasteners 48 to extend through the anchor 60. Once the fasteners 48 are positioned within the airbag apertures 66, the nuts 50 may be respectively and threadably attached to the fasteners 48 in an effort to fixedly attach the fasteners 48 and, thus, the inflator 40 and cushion 38 to the anchor 60.

As thus far described, the seatbelt aperture 64 may cooperate with the first end 22 of the seatbelt 12 to attach the seatbelt 12 to the anchor 60. Likewise, the airbag apertures 66 may cooperate with the fasteners 48 to attach the cushion 38 and inflator 40 to the anchor 60. As such, the seatbelt 12, airbag 14, and anchor 60 may form an assembly that can be attached to the mobile platform 16 by attaching the anchor 60 to the mobile platform 16.

In one configuration, the anchor 60 may be fixedly attached to the mobile platform 16 by inserting a fastener 70 through the attachment aperture 68 of the anchor 60. The fastener 70 may subsequently and threadably be received by the mobile platform 16 to attach the anchor 60 and, thus, the seatbelt 12 and airbag 14, to the mobile platform 16. The fastener 70 may cooperate with the anchor 60 to fix the anchor 60 for movement with the mobile platform 16 such that the anchor 60 is prevented from moving relative to the mobile platform 16. Alternatively, the fastener 70 may be inserted through the attachment aperture 68 of the anchor 60 and subsequently be received by the mobile platform 16 to attach the anchor 60 to the mobile platform 16 while concurrently allowing rotation of the anchor 60 relative to the mobile platform 16 and fastener 70. While the anchor 60 is described and shown as being attached to the mobile platform 16 via a threadable fastener 70, the anchor 60 could be attached to the mobile platform 16 via a weld stud or other suitable fastener that allows for attachment of the anchor 60 to the mobile platform 16.

While the airbag 14 may be attached to the main body 26 of the seatbelt 12 via stitching (not shown), the airbag 14 may additionally or alternatively be held in position relative to the main body 26 via a cover 72. The cover 72 may be formed from a relatively flexible material such as, for example, neoprene, leather, or rubber, and may surround a portion of the main body 26 and cushion 38. The cover 72 may include a narrow portion 74, a wide portion 76, and a flange 78. The narrow portion 74 may be positioned proximate to a distal end of the airbag 14 and may be sized to closely surround the main body 26 of the seatbelt 12. The wide portion 76 may be disposed between the narrow portion 74 and the flange 78 and may surround the cushion 38 of the airbag 14 to conceal the cushion 38 when the cushion 38 is in the pre-deployed state and, further, to maintain the cushion 38 in close proximity to the main body 26 of the seatbelt 12 when the cushion 38 is in the pre-deployed state.

The cushion 38 may be folded into a relatively compact shape to allow the cushion 38 to be positioned adjacent to the main body 26 of the seatbelt 12 and to allow the cushion 38 to be received within the wide portion 76 of the cover 72. In one configuration, the cushion 38 is folded in a direction along a longitudinal axis of the main body 26 and toward the anchor 60. For example, the second end 44 (FIG. 7) of the cushion 38 may be folded in a direction toward the main body 62 to allow the cushion 38 to be folded on itself and be received within the wide portion 76 of the cover 72. Folding the cushion 38 in the foregoing manner such that the second end 44 is folded in a direction toward the anchor 60 results in the wide portion 76 of the cover 72 being reduced and, as a result, reduces the overall size of the cover 72.

The flange 78 may extend from the wide portion 76 and may attach the cover 72 to the anchor 60. For example, the flange 78 may include an attachment aperture 80 that receives the fastener 70 to attach the cover 72 to the anchor 60. Attaching the cover 72 to the anchor 60 fixes a position of the cover 72 relative to the seatbelt 12 and airbag 14 and ensures that the cover 72 remains in a desired position relative to the seatbelt 12 and airbag 14 when the airbag 14 is in the pre-deployed state.

The cover 72 may provide the mobile platform 16 with a so-called class A surface. As such, the cover 72 may be formed from an aesthetically pleasing material such as, for example, leather, or may be provided with a simulated grained outer surface 82. In addition, the cover 72 may include a taper 84 extending between the narrow portion 74 and the wide portion 76 to provide the cover 72 with a relatively subtle transition from the narrow portion 74 and the wide portion 76.

The cover 72 may additionally include one or more tear seams 86 that provide the cover 72 with one or more areas of reduced thickness to allow the cushion 38 to move from the pre-deployed state to the inflated state. Further, the tear seams 86 may work in conjunction with the cushion 38 to direct the cushion 38 in a desired direction upon movement from the pre-deployed state to the deployed state by guiding the cushion 38 during movement from the pre-deployed state to the inflated state. Finally, the cover 72 may include perforations 88 proximate to the flange 78 that allow the flange 78 to separate from the wide portion 76 upon movement of the cushion 38 from the pre-deployed state to the inflated state.

With particular reference to FIGS. 5-8, operation of the restraint device 10 will be described in detail. As described above, an occupant 20 may be disposed within a seat 18 of a mobile platform 16 such as, for example, a vehicle. Once seated, the occupant 20 may apply a force to the main body 26 of the seatbelt 12 to position the tongue 34 relative to the latch 36 in an effort to secure the tongue 34 within the latch 36. Once secured, the main body 26 of the seatbelt 12 spans a waist area and a chest area of the occupant 20 to retain the occupant 20 within the seat 18 should the mobile platform 16 experience an impact event.

Should the mobile platform 16 experience a side-impact event, a signal may be sent to the squib/initiator 54 to cause the squib/initiator 54 to ignite the pyrotechnic material 58 of the inflator 40. Ignition of the pyrotechnic material 58 generates high-pressure gas, which enters the cushion 38 via the diffuser 56. The gas enters the cushion 38, thereby causing the cushion 38 to inflate and move from the pre-deployed state (FIG. 5) to the inflated state (FIG. 7). In so doing, the cushion 38 may rupture a portion of the cover 72 along the tear seams 86 (FIG. 6) until the cushion 38 is fully inflated (FIG. 7). Upon full inflation, the cushion 38 may absorb energy associated with the side-impact event in an effort to protect the occupant 20.

The trajectory of the cushion 38 may be controlled by a shape of the cushion 38 as well as by the location of the tear seams 86 associated with the cover 72. In addition, the cushion 38 may be guided by a tether 90 (FIGS. 3 and 8) that is attached to the cushion 38 at two attachment locations 92 and spans an area of the main body 26 of the seatbelt 12. The tether 90 may be positioned proximate to an upper portion of the cushion 38 in an effort to move the cushion 38 toward a seat bottom 94 of the seat 18 during deployment. Movement of the cushion 38 toward the seat bottom 94 may likewise position the cushion 38 relative to a hip of the occupant 20 upon full inflation of the cushion 38.

The tether 90 may be located at any location of the cushion 38 and may be tailored to properly orient the cushion 38 relative to the occupant 20 upon full inflation of the cushion 38. Because the tether 90 is attached to the cushion 38 at two locations 92 and, further, because the main body 26 of the seatbelt 12 is slidably disposed between the cushion 38 and the tether 90, movement of the cushion 38 from the pre-deployed state to the inflated state may be guided by the main body 26 of the seatbelt 12. Specifically, the tether 90 may cause the cushion 38 to follow the trajectory of the main body 26, as the cushion 38 is moved from the pre-deployed state to the inflated state. In short, interaction between the main body 26 of the seatbelt 12 and the tether 90 of the cushion 38 guides movement of the cushion 38 from the pre-deployed state into the inflated state and, as a result, positions the cushion 38 at a desired location relative to the seat 18 and occupant 20 upon full inflation of the cushion 38.

While the airbag 14 is shown and described as being positioned relative to the main body 26 such that the main body 26 of the seatbelt 12 is disposed between the occupant 20 and the airbag 14, the airbag 14 could alternatively be attached to the main body 26 such that the airbag 14 is disposed between the occupant 20 and the seatbelt 12. Regardless of the particular location of the cushion 38 relative to the main body 26, the cushion 38 may be moved from the pre-deployed state to the inflated state should the mobile platform 16 experience an impact event and may be positioned relative to the occupant 20 due to interaction between the tether 90 and the main body 26 of the seatbelt 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A restraint system for a mobile platform, the restraint system comprising:
   a seatbelt;
   an anchor attached to said seatbelt and to the mobile platform;
   an airbag attached to the mobile platform via said anchor, said airbag movable from a pre-deployed state to an inflated state; and
   a cover extending over said seatbelt and said airbag when said airbag is in said pre-deployed state, said cover including a narrow portion closely surrounding said seatbelt and a wide portion disposed proximate to said anchor and receiving said airbag when said airbag is in said pre-deployed state.

2. The restraint system of claim 1, wherein said airbag is attached to said seatbelt.

3. The restraint system of claim 2, wherein said airbag is integrally formed with said seatbelt.

4. The restraint system of claim 1, wherein said seatbelt guides said airbag during movement of said airbag from said pre-deployed state to said inflated state.

5. The restraint system of claim 1, further comprising a tether connecting said airbag to said seatbelt, said tether operable to guide said airbag during movement of said airbag from said pre-deployed state to said inflated state.

6. The restraint system of claim 5, wherein said tether is slidably attached to said seatbelt.

7. The restraint system of claim 1, wherein said cover includes at least one tear seam operable to permit movement of said airbag from said pre-deployed state to said inflated state.

8. The restraint system of claim 1, wherein said airbag is folded in a direction toward said anchor when said airbag is in said pre-deployed state.

9. A restraint system for a mobile platform, the restraint system comprising:
   a seatbelt;
   an airbag attached to said seatbelt and movable from a pre-deployed state to an inflated state, said airbag guided by said seatbelt when moving from said pre-deployed state to said inflated state; and
   a cover extending over said seatbelt and said airbag when said airbag is in said pre-deployed state, said cover including a narrow portion closely surrounding said seatbelt and a wide portion receiving said airbag when said airbag is in said pre-deployed state.

10. The restraint system of claim 9, further comprising a tether that connects said airbag to said seatbelt, said tether operable to guide said airbag during movement of said airbag from said pre-deployed state to said inflated state.

11. The restraint system of claim 10, wherein said tether is slidably attached to said seatbelt.

12. The restraint system of claim 10, wherein said tether surrounds said seatbelt.

13. The restraint system of claim 9, further comprising an anchor attached to said seatbelt and said airbag, said anchor operable to attach said seatbelt and said airbag to the mobile platform.

14. The restraint system of claim 13, wherein said airbag is folded in a direction toward said anchor when said airbag is in said pre-deployed state.

15. The restraint system of claim 9, wherein said cover includes at least one tear seam operable to permit movement of said airbag from said pre-deployed state to said inflated state.

16. The restraint system of claim 9, wherein said airbag is integrally formed with said seatbelt.

17. A restraint system for a vehicle, the restraint system comprising:
- a seatbelt;
- an airbag carried by said seatbelt;
- a cover surrounding a portion of said seatbelt and extending over said airbag when said airbag is in a pre-deployed state, said cover including a first portion closely surrounding said portion of said seatbelt and a second portion receiving said airbag when said airbag is in said pre-deployed state; and
- a tether connecting said airbag to said seatbelt, said tether operable to guide said airbag during movement of said airbag from said pre-deployed state to an inflated state.

18. The restraint system of claim 17, wherein said tether is slidably attached to said seatbelt.

19. The restraint system of claim 17, wherein said airbag is integrally formed with said seatbelt.

* * * * *